United States Patent [19]
Titus et al.

[11] Patent Number: 5,908,564
[45] Date of Patent: *Jun. 1, 1999

[54] TUNABLE, SELF-POWERED ARC PLASMA-MELTER ELECTRO CONVERSION SYSTEM FOR WASTE TREATMENT AND RESOURCE RECOVERY

[75] Inventors: Charles H. Titus, Newtown Square, Pa.; Daniel R. Cohn, Chestnut Hill, Mass.; Jeffrey E. Surma, Kennewick, Wash.

[73] Assignee: Battelle Memorial Institute, Richland, Wash.

[ * ] Notice: This patent is subject to a terminal disclaimer.

[21] Appl. No.: 08/911,408

[22] Filed: Aug. 14, 1997

Related U.S. Application Data

[63] Continuation of application No. 08/492,429, Jun. 19, 1995, Pat. No. 5,798,497, which is a continuation-in-part of application No. 08/382,730, Feb. 2, 1995, Pat. No. 5,666,891.

[51] Int. Cl.$^6$ .................................................. B23K 10/00
[52] U.S. Cl. ............................... 219/121.36; 219/121.37; 219/121.38; 373/18; 110/346; 110/250; 588/900
[58] Field of Search ........................ 219/121.36, 121.37, 219/121.38, 121.48, 121.43, 121.57, 121.54, 121.53; 588/900; 373/18–22; 110/235–248, 346, 250

[56] References Cited

U.S. PATENT DOCUMENTS

| | | |
|---|---|---|
| 2,927,143 | 3/1960 | Jensen . |
| 3,104,352 | 9/1963 | Tiemann . |
| 3,436,641 | 4/1969 | Biringer . |
| 3,470,444 | 9/1969 | Bixby . |
| 3,767,831 | 10/1973 | Plockinger et al. . |
| 3,779,182 | 12/1973 | Camacho . |
| 3,789,127 | 1/1974 | Bowman . |
| 3,812,620 | 5/1974 | Titus et al. . |

(List continued on next page.)

FOREIGN PATENT DOCUMENTS

| | | |
|---|---|---|
| 0096538 | 12/1983 | European Pat. Off. . |
| WO87/05775 | 9/1987 | WIPO . |

OTHER PUBLICATIONS

Bitler, et al., U.S. Patent Application Ser. No. 08/274829, "Process for Remediation of Lead–Contaminated Soil and Waste Battery Casings".

"The Solid Waste Dilemma: An Agenda for Action", Toxic Subst. J., vol. 9, No. 1, pp. 9–54 (1989).

(List continued on next page.)

*Primary Examiner*—Mark H. Paschall
*Attorney, Agent, or Firm*—Choate, Hall & Stewart

[57] ABSTRACT

The present invention provides a relatively compact self-powered, tunable waste conversion system and apparatus which has the advantage of highly robust operation which provides complete or substantially complete conversion of a wide range of waste streams into useful gas and a stable, nonleachable solid product at a single location with greatly reduced air pollution to meet air quality standards. The system provides the capability for highly efficient conversion of waste into high quality combustible gas and for high efficiency conversion of the gas into electricity by utilizing a high efficiency gas turbine or by an internal combustion engine. The solid product can be suitable for various commercial applications. Alternatively, the solid product stream, which is a safe, stable material, may be disposed of without special considerations as hazardous material. In a preferred embodiment of the invention, the arc plasma furnace and joule heated melter are formed as a fully integrated unit with a common melt pool having circuit arrangements for the simultaneous independently controllable operation of both the arc plasma and the joule heated portions of the unit without interference with one another. The apparatus may additionally be employed with reduced or without further use of the gases generated by the conversion process. The apparatus may be employed as a self-powered or net electricity producing unit where use of an auxiliary fuel provides the required level of electricity production.

51 Claims, 6 Drawing Sheets

U.S. PATENT DOCUMENTS

| | | |
|---|---|---|
| 3,841,239 | 10/1974 | Nakamura et al. . |
| 3,918,374 | 11/1975 | Yamamoto et al. . |
| 3,995,100 | 11/1976 | Jäeger . |
| 4,099,227 | 7/1978 | Liptak . |
| 4,105,437 | 8/1978 | Liu . |
| 4,110,821 | 8/1978 | Hisano et al. . |
| 4,326,842 | 4/1982 | Adachi et al. . |
| 4,431,612 | 2/1984 | Bell et al. . |
| 4,461,010 | 7/1984 | Titus . |
| 4,466,824 | 8/1984 | Gauvin et al. . |
| 4,644,877 | 2/1987 | Barton et al. . |
| 4,766,598 | 8/1988 | Titus et al. . |
| 4,802,919 | 2/1989 | Fey . |
| 4,818,836 | 4/1989 | Bebber et al. . |
| 4,895,678 | 1/1990 | Ohtsuka et al. . |
| 4,922,099 | 5/1990 | Masuda et al. . |
| 5,095,828 | 3/1992 | Holden et al. . |
| 5,280,757 | 1/1994 | Carter et al. . |
| 5,284,503 | 2/1994 | Bitler et al. . |
| 5,370,724 | 12/1994 | Bitler et al. . |
| 5,439,498 | 8/1995 | Bitler et al. . |
| 5,451,738 | 9/1995 | Alvi et al. . |
| 5,484,978 | 1/1996 | Hedberg et al. |

OTHER PUBLICATIONS

Buelt, et al., "In Situ Vitrification of Transuranic Waste: An Updated Systems Evaluation and Applications Assessment", PNL–4800 Suppl. 1, pp. ix–xiv, 79–86 (1987).

Carter, et al., "Municipal Solid Waste Feasibility of Gasification Plasma Arc," Industrial and Environmental Applications of Plasma, Proceedings of the First International EPRI Plasma Symposium, CMP Report No. 90–9, pp. 13–1–13–13 (1990).

Chapman, "Evaluation of Vitrifying Municipal Incinerator Ash;", Ceramic Transactions: Nuclear Waste Management IV, Ceramic Transactions, American Chemical Society, vol. 23, pp. 223–233 and 349–394 (1991).

Denison et al., "Recycling & Incineration: Evaluating the Choices", pp. 104–145 and 177–200 (1990).

Graef et al., "Product Distribution in the Rapid Pyrolysis of Biomass/Lignin for Production of Acetylene", American Chemical Society, pp. 293–312 (1981).

Johansson et al., "Renewable Energy; Sources for Fuels and Electricity," Island Press, pp. 726–747 (1993).

Hamrick, "Biomass–Fueled Gas Turbines", Clean Energy From Waste and Coal, ACS Symposium Series 515, American Chemical Society, pp. 78–89 (1993).

TUNABLE, SELF-POWERED ARC PLASMA-MELTER ELECTRO CONVERSION SYSTEM FOR WASTE TREATMENT AND RESOURCE RECOVERY

CROSS-REFERENCE TO RELATED APPLICATIONS

This application is a continuation application of U.S. Ser. No. 08/492,429, filed Jun. 19, 1995, now U.S. Pat. No. 5,798,497, which application is a continuation-in-part application of U.S. Ser. No. 08/382,730 filed Feb. 2, 1995, now U.S. Pat. No. 5,666,891, both of which are incorporated herein by reference.

TECHNICAL FIELD

The present invention generally relates to systems for waste conversion, and more particularly to independently controllable arc plasma-joule heated melter combinations as integrated systems to provide a tunable waste treatment and power production facility.

BACKGROUND OF THE INVENTION

The disposal of municipal solid waste (MSW) and other waste has become a major issue over the past few decades due to space limitations for landfills and problems associated with siting new incinerators. In addition, increased environmental awareness has resulted in a major concern of many large metropolitan areas and to the country as a whole to ensure that the disposal of solid waste is properly handled. See e.g., USA EPA, The Solid Waste Dilemma: An Agenda for Action, EPA/530-SW-89-019, Washington, D.C. (1989).

Attempts have been made to reduce the volume and recover the energy content of MSW through incineration and cogeneration. The standard waste-to-energy incinerator will process the solid combustible fraction of the waste stream, produce steam to drive a steam turbine, and as a result of the combustion process produce a waste ash material. Typically, the ash is buried in a municipal landfill. Current trends and recent rulings, however; may require such material to be shipped to landfills permitted for hazardous waste. This will substantially increase ash disposal costs. Moreover, there is increased public concern about gaseous emissions from landfills and the possibility of contamination of groundwater. Another disadvantage associated with incinerator systems is the production of large quantities of gaseous emissions resulting in the need for costly air pollution control systems in an attempt to decrease emission levels to comply with requirements imposed by regulatory agencies.

In order to overcome the shortcomings associated with incinerator systems, attempts have been made in the prior art to utilize arc plasma torches to destroy toxic wastes. The use of arc plasma torches provides an advantage over traditional incinerator or combustion processes under certain operating conditions because the volume of gaseous products formed from the plasma arc torch may be significantly less than the volume produced during typical incineration or combustion, fewer toxic materials are in the gaseous products, and under some circumstances the waste material can be glassified.

For example, U.S. Pat. No. 5,280,757 to Carter et al. discloses the use of a plasma arc torch in a reactor vessel to gasify municipal solid waste. A product having a medium quality gas and a slag with a lower toxic element leachability is produced thereby.

U.S. Pat. No. 4,644,877 to Barton et al. relates to pyrolytic destruction of polychlorinated biphenyls (PCBs) using a plasma arc torch. Waste materials are atomized and ionized by a plasma arc torch and are then cooled and recombined into gas and particulate matter in a reaction chamber. U.S. Pat. No. 4,431,612 to Bell et al. discusses a hollow graphite electrode transfer arc plasma furnace for treatment of hazardous wastes such as PCBs.

A process for remediation of lead-contaminated soil and waste battery material is disclosed in U.S. Pat. No. 5,284,503 to Bitler et al. A vitrified slag is formed from the soil. Combustible gas and volatized lead, which are formed from the waste battery casings, are preferably transferred to and used as a fuel for a conventional smelting furnace.

The systems proposed by Barton et al., Bell et al., Carter et al., and Bitler et al. have significant disadvantages. For example, such disadvantages include insufficient heating, mixing and residence time to ensure high quality, nonleachable glass production for a wide range of waste feeds. Additionally, hearth size and feeder design are significantly limited since furnace walls must be relatively close to the arc plasma which is the only heat source. High thermal stress on the walls of the furnace often occurs as a result of the limitation on the hearth size.

Prior art arc plasma furnaces with metal electrodes further may be limited by short electrode lifetime when used at higher DC current. Therefore, to achieve higher power output, the arc potential must be raised by lengthening the arc. This results in radiative thermal losses to the furnace side walls and leads to metal electrode (torch) ineffectiveness. In addition, there are often difficulties associated with prior art transfer arc plasmas in start-up and restarting of such arc plasma systems when cold, nonelectrically conducting material is being processed.

Thus, while such prior art attempts have been useful, there remains a need in the art for a robust, easy to operate waste conversion system which minimizes hazardous gaseous emissions and which maximizes conversion of a wide range of solid waste into useful energy and produces a product stream which is in a safe, stable form for commercial use or which does not require special hazardous waste considerations for disposal. It would therefore be desirable to provide a robust, user friendly and highly flexible method and apparatus for processing and converting a wide range of waste materials into useful energy and stable products while minimizing hazardous gaseous emissions, thereby overcoming the shortcomings associated with the prior art.

SUMMARY OF THE INVENTION

It is an object of the present invention to provide a method and apparatus for increased conversion of solid waste materials such as municipal and industrial waste to useful energy with greatly reduced air pollution.

It is another object of the present invention to provide a method and apparatus for converting a wide range of waste materials to useful commercial products or to a safe, stable product which is suitable for disposal.

It is another object of the invention to provide a method and apparatus for converting waste materials using a combination of an independently controllable arc plasma and joule heated melter as an integrated system.

It is a further object of the invention to provide a method and apparatus for converting waste materials using a fully integrated joule heated melter and arc plasma unit.

It is yet a further object of the invention to provide a method and apparatus for converting waste materials in which a joule heated melter and an arc plasma in a fully integrated system are operated simultaneously with a common molten pool and with independent control of the power to each.

It is yet a further object of the invention to provide a method and apparatus for vitrifying waste materials using a combination joule heated melter and arc plasma as an integrated system.

It is still a further object of the invention to provide a method and apparatus for converting waste materials using fast pyrolysis, thereby providing a high purity gas suitable for combustion.

It is yet a further object of the present invention to provide a method and apparatus for highly effective conversion of waste materials to gaseous fuel capable of generating electricity through a small, highly efficient gas turbine or internal combustion engine.

It is still a further object of the invention to provide a waste conversion unit that can be self-powered or can provide a given level of electricity for outside use by utilizing an auxiliary fuel, such as natural gas, diesel or some other fuel, in varying amounts in the gas turbine or internal combustion engine.

These and other objects of the invention are provided by a system which is capable of processing municipal solid waste (MSW), industrial waste or other waste forms into a stable nonleachable product which is suitable for use commercially or which can be disposed of without risk to the environment. The system also minimizes air emissions and maximizes production of a useful gas product for the production of electricity.

The present invention provides a compact waste-to-energy processing system that has the advantage of complete or substantially complete conversion of waste materials into a useful gas and a product stream at a single location. In addition, the product stream may be used in a variety of commercial applications. Alternatively, the product stream, which is in a safe, stable waste form, does not require special hazardous considerations for disposal.

The combination of the arc plasma furnace and the joule heated melter as an integrated system with gas turbine or internal combustion engine generating equipment provides a self-powered waste treatment and power production facility which is capable of being deployed in relatively small modular units and which can be easily scaled to handle large volumes of municipal solid waste.

The primary processing unit preferably includes a DC arc plasma for heating waste material and also has joule heating capability for the melt pool. Preferably, the electrode arc or arcs is a DC electrode arc or arcs with electrodes formed of graphite. The use of a DC arc electrode in combination with a special electrical circuit ensures simultaneous independent control of the arc plasma and the joule heated melter. The primary mode of operation of the arc plasma and joule heated melter is pyrolysis (oxygen starved operation). In a preferred embodiment, the system is operated such that fast pyrolysis occurs, thereby producing a gas with higher purity as compared with other methods of pyrolysis.

In a preferred embodiment of the present invention, the arc plasma and joule heated melter components are fully integrated with a common molten pool such that the system is capable of simultaneous independently controllable, i.e. tunable, operation of these components. The arc plasma occurs between a graphite electrode or electrodes and the molten material. Graphite is the preferred arc electrode material rather than metal since graphite electrodes simplify the process and since graphite has much higher current capability than a metal electrode in a plasma torch. In addition, graphite electrodes require less maintenance relative to the frequent tip replacements of the metal electrode plasma torch systems. It should be appreciated, however, that other metallics elements such as tungsten or the like may be utilized as the electrode material.

The tunable fully integrated system employs electrical and mechanical design features to maximize flexibility and effectiveness. The benefits of this embodiment of the invention include, but are not limited to, high processing rates for vitrification of a large variety of materials into high quality, stable, non-leachable glass and reduced volume requirements due to the integrated system. The joule heated melter provides deep volume heating and is capable of maintaining a constant temperature throughout the melt pool with uniform mixing characteristics, thereby resulting in a high quality, homogenous glass product. The arc plasma provides the necessary radiant surface heating for processing feed material in a highly efficient manner and at significantly higher rates than other technologies. Simultaneous independently controllable operation of the arc plasma and joule heated melter is provided by predetermined arc melter configurations and electrical circuits. While not meant to be limiting, the arc plasma preferably is operated by a DC arc and the joule heated melter is operated by AC power. The DC arc and AC powered joule heated melter arrangement ensures the ability to independently control and operate each component.

The use of the melter in combination with the arc plasma provides more uniform heating than prior art techniques. In addition, utilizing deep volume heating provided by the joule heated glass melter facilitates ease of operation. It also provides the constant heat source necessary to maintain sufficient electrical conductivity in the waste material for rapid restart of the arc plasma which uses an electrical conduction path through the waste material. Additionally, the fully integrated system allows the furnace walls to be further from the arc plasma since there is an additional heat source provided. Inductive heating and/or mixing coils may be utilized to provide additional heating and/or mixing in the melt pool. The increase in wall distance from the arc plasma increases feed options and reduces thermal stress on the furnace lining. The present invention also allows the use of electrodes having a long life and a very wide range of arc plasma and joule heater power levels.

The independent control of the arc plasma and the joule heated melter power provides a continuously tunable mix of surface and deep volume heating, which can be optimized for different phases of operation. For example, additional heating may be required for pouring glass or maintaining the glass pool temperature while additional surface heating may be necessary during the initiation of feeding. In addition, different mixes of surface and volume heating are appropriate for different waste streams. The ratio of surface to deep volume heating may be less for municipal waste, for example, than for industrial waste containing large amounts of metals and high temperature materials.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibit substantial volume reduction over prior art vitrification products. The solidified form is suitable for disposal without health risks or risks to the environment.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which.

Similar reference characters refer to similar parts throughout the several views of the drawings.

DETAILED DESCRIPTION OF THE PREFERRED EMBODIMENTS

Figure 1A:
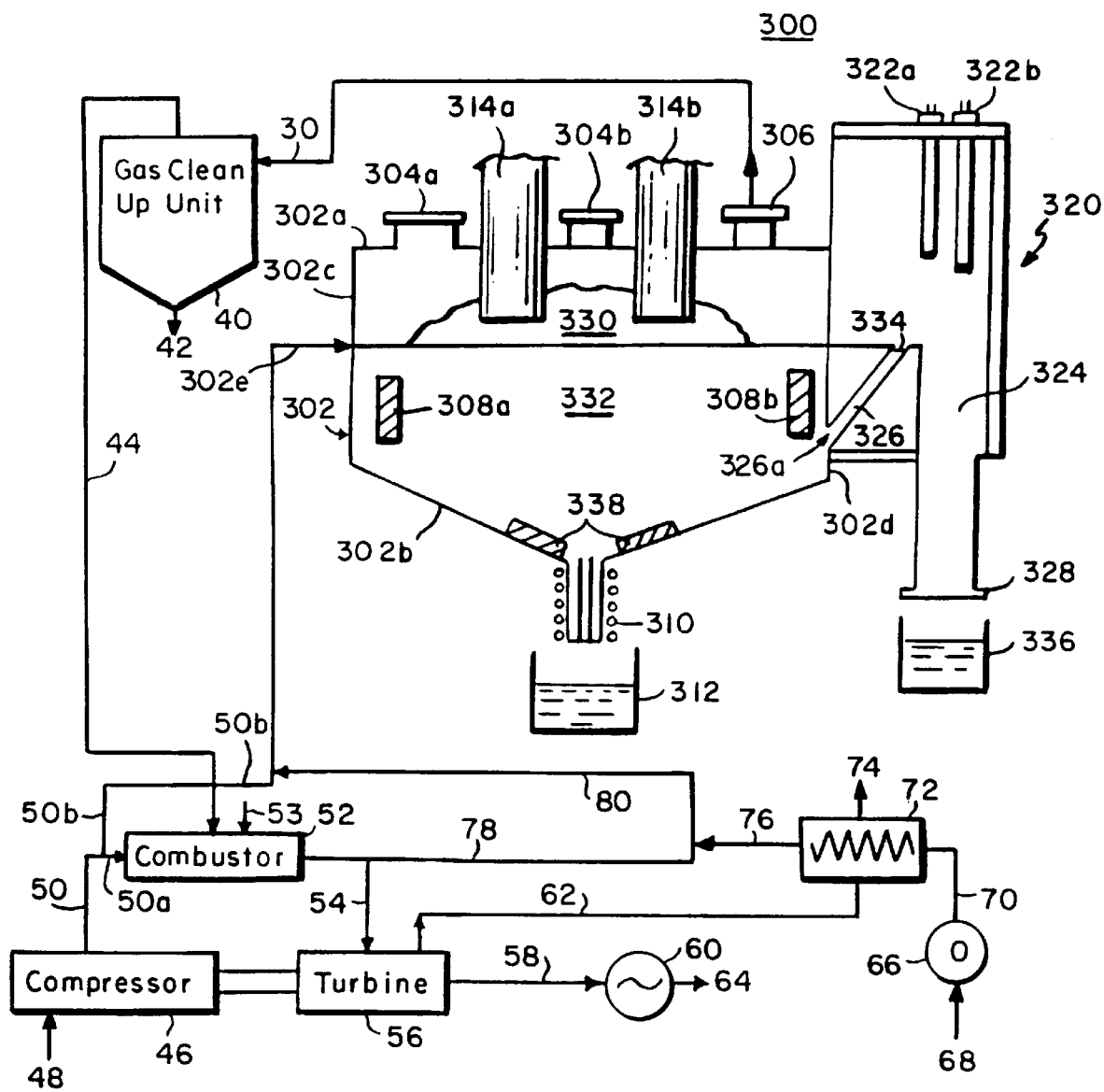
FIG. 1(a) shows a preferred embodiment of the arc plasma furnace and joule heated melter according to the present invention in which the furnace and melter are formed as a fully integrated system with a common molten bath.

A preferred embodiment of the invention is shown in FIGS. 1–5. In this embodiment, the DC arc and the AC joule heated electrical systems are fully integrated and operated simultaneously in a single glass melt, but are isolated electrically from one another through the use of a special power delivery circuit. The arc plasma-melter combinations illustrated in FIGS. 1(a)–1(d) and 2 are thus integrated both thermally and electrically.

The fully integrated plasma-melter systems in accordance with the present invention provide the advantage of having continuously tunable proportions of power between the plasma heating and the glass melter heating. For example, the continuously tunable independent powering is useful when it is desirable to utilize one portion of the system, e.g. the arc plasma or the melter. The continuously tunable independent powering provides robustness and facilitates ease of operation under changing conditions. The continuously tunable independent powering additionally improves efficiency and maximizes environmental attractiveness by providing additional control over solid waste products, e.g. glass, and off gas generation.

Continuously tunable independent operation of the arc plasma and melter allows the user to select various types of heating. For example, the arc plasma (or plasmas) provides radiative surface heating. Large amounts of plasma power may be used at the initiation of feeding. Somewhat lower, but still substantial amounts of plasma power may be used during continuous feeding. High surface waste temperature heating facilitates high throughput processing as well as fast pyrolysis to produce high quality combustible gas. High surface heating is also needed for processing where the material is difficult to melt or where the material is highly conductive, thereby limiting the effectiveness of joule heating with glass in the absence of arc plasma.

Joule heating with glass melter electrodes provides deep, volumetric heating. This type of heating ensures production of high quality glass by promoting mixing in the entire melt pool. It also provides conductive material for more stable transfer arc operation. Independent use of volumetric heating may also be utilized to maintain the waste in a molten state at low power requirements when there is no feed. Volumetric heating is also important for glass pouring.

Continuously tunable independent powering of plasma heating and glass melter heating facilitates the use of extra volumetric heating for purposes of glass pouring or improved glass production without increasing the adverse effects of only plasma heating such as excessive volatilization of material and thermal stressing of the furnace wall.

In addition to continuously tunable independent powering during processing of a given type of waste stream, the tunable features of the integrated plasma melter unit may be used to optimize processing of different types of waste streams. For example, municipal waste streams may generally require lower relative amounts of plasma power than would streams that have high melting temperature materials and larger amounts of metals such as hazardous and industrial wastes composed largely of inorganic substances.

The use of volumetric melter heating also facilitates a greater range of options for plasma electrode configurations. Because volumetric melter heating maintains material in a substantially molten and conductive state, more than one plasma electrode may readily be utilized. This is in part due to the molten material providing the conducting path between the electrodes. It is thus readily possible to continuously tune operation for the use of one or more plasma electrodes. The increased flexibility may be used to optimize production of combustible gas, minimize particulate emission and reduce electrode wear.

Continuously tunable independent powering of the plasma and melter heating systems thus provides a greatly expanded amount of temperature control. Spatial and temporal control of temperature which had not been previously available may be used to improve the practicality and environmental attractiveness of combined arc plasma and melter vitrification systems.

As discussed herein, the full integration of a joule heated melter with the arc plasma in accordance with the present invention also facilitates the use of an elongated melt chamber with two arc plasma electrodes. The molten material is capable of providing a conducting or current path between the two arc plasma electrodes. This configuration significantly increases flexibility of waste feed and slag tapping and increases arc plasma electrode life and robustness. The two arc plasma electrode-elongated chamber arrangement is facilitated by the joule heated melter because the joule heated melter is capable of providing the necessary heat to maintain a conducting path between the two arc plasma electrodes during idle furnace periods and also provides uniform heating in the elongated melt chamber.

The embodiments of the invention shown in FIGS. 1–5 include a circuit arrangement which allows passage of the required AC power through the melt using submerged electrodes as in standard conventional joule heated melters, and which also allows simultaneous operation of a DC arc plasma circuit through the melt between upper movable electrodes or, if desired, between these electrodes and/or a submerged counter electrode. The type of waste and the character of the molten slag will determine the preferred operating mode.

The integrated arc plasma-melter unit 300 is shown in FIGS. 1(a)–1(d) and includes reaction vessel 302. It should be appreciated that the joule heated melter facilitates production of a high quality pyrolysis gas using the minimum energy input to the process. This situation exists because energy input to the arc does not need to be greater than that required to pyrolyze and melt the material in the arc zone. The molten bath below the unmelted feed material is maintained at desired temperature using joule heating as opposed to using only an arc plasma furnace. The energy requirements to maintain the slag at the proper temperature are equal to the heat losses from the melter outer surface. This is expected to be to be very low, i.e., about 20–30 KW/m$^2$ of slag or glass surface area for a properly designed melt chamber. Air/oxygen and/or a combination of air and steam is added to eliminate char from the melt surface and adjust the redox state of the glass. The joule heated melter provides energy (i.e. hot glass) near the sides of the bath where the gas/steam mixture is introduced. Integrated unit 300 may also include auxiliary heater 320.

Reaction vessel 302 includes top 302a, bottom 302b, and sides 302c and 302d. Bottom 302b may have a generally V-shaped configuration as illustrated in FIGS. 1(a)–1(d). Reaction vessel 302 further includes at least one port or opening 304a for introducing waste material 330 into reaction vessel 302. In a preferred embodiment, reaction vessel 302 includes a plurality of ports or openings 304a and 304b as shown in FIGS. 1(a)–1(d). The feed system may be any conventional type of feed system which is capable of feeding municipal solid waste or other waste such as hazardous waste, hospital waste, ash from an incinerator or the like to vessel 302 so long as the feed system does not allow air to enter the vessel through the feed system. Ports 304a and 304b may include a flow control valve or the like to control the flow of waste material 330 into vessel 302 and to prevent air from entering vessel 302 therethrough. It is also preferred that such ports 304a and 304b be capable of being controlled such that one or more can be selectively utilized separately or simultaneously with one or another. Reaction vessel 302 also includes gas port or opening 306 and metal/slag pouring port or opening 310. Opening or gas discharge port 306 may be formed of any conventional material which allows controlled discharge of a combustible gas. For example and while not meant to be limiting, port 306 may be provided with a flow control valve or the like so that gas formed in reaction vessel 302 may be selectively released into line 30. It is preferred that gas dscharge port 306 be positioned at or near top 302a of vessel 302.

Metal/slag port 310 allows metal/slag which has formed and collected in vessel 302 to be discharged and separated from the gases and slag formed in vessel 302. Discharge port 310 is constructed in any manner which is capable of controlling the discharge of molten material from vessel 302. In particular, port 310 is designed to have a flow control valve or the like so that metal and/or slag may be removed and introduced into metal/slag collector 312 at predetermined periods of time during the process. When hazardous waste is being processed, it may be desirable to have collector 312 sealably connected to port 310 in a manner such that air and/or gases do not enter or exit the system therethrough. Vessel 302 may include additional ports such as air or gas entry port 302e, shown in FIGS. 1(a) and 1(b). Air or gas entry port 302e includes flow control, such as a flow control valve or the like. Preferably, port 302e is positioned to enter through the furnace wall at a level proximate to slag material 332 as shown in FIG. 1(a). In this manner, air 50b (which may contain a predetermined amount of steam 80), is injected into vessel 302 at a controlled rate and time during the conversion process to control the composition of the gas exiting the furnace. In addition, air and/or steam may be introduced through opening 302e to ensure that any carbon in the feed material has been converted to carbon-containing gases such as CO, $CO_2$, $H_2$, $CH_4$ and the like. This reduces the amount of charring during the process which may result when carbon is not completely converted to carbon-containing gases.

As further illustrated in FIG. 1(a), system 300 also includes turbine 56, generator 60, and the necessary equipment required to couple the arc furnace-melter unit thereto. For example, system 300 preferably includes hot gas cleaning equipment 40, waste heat recovery unit 72, and air 48 and water 68 injection systems. While not shown in FIG. 1(a), a feed conditioning process for waste material 330 may also be utilized prior to being fed to vessel 302. In addition to the units shown in FIG. 1(a), it may be desirable to incorporate an off-gas scrubbing process for gases exiting clean-up unit 40 or the gas fired turbine to remove any acid gases therefrom. Preferably, the only gas conditioning required for the gases exiting arc vessel 302 is gas-solid separation in hot gas clean-up unit 40 to minimize the amount of particulates entering turbine 56.

The gases produced in vessel 302 are combustible gases formed as a result of fast pyrolysis. As discussed herein, fast pyrolysis generally results in at least 65% conversion of waste material to a useful gas for combustion. While not to be construed as limiting, vessel 302 utilized in accordance with the present invention is expected to provide a gas containing about: 2% carbon dioxide, 44% carbon monoxide, 43% hydrogen, 2% methane and the balance being light hydrocarbons. The gas produced in vessel 302 is transported through line 30 to hot gas clean up unit 40 where ash 42 is removed and thus separated from fuel gas 44.

Intake air 48 enters compressor 46 and air 50 exiting compressor 46 may be divided into several delivery streams. For example, air flow 50a is fed to combustor 52 and air flow 50b may be fed to vessel 302.

Fuel gas 44 enters combustor 52 and combines with air 50a. Hot gases and steam 54 produced in combustor 52 drive turbine 56 which is connected to generator 60 via 58 such that electricity 64 is thereby generated. Turbine 56 is preferably a high efficient steam-injected gas turbine. Such turbines are commercially available.

Figure 1B:
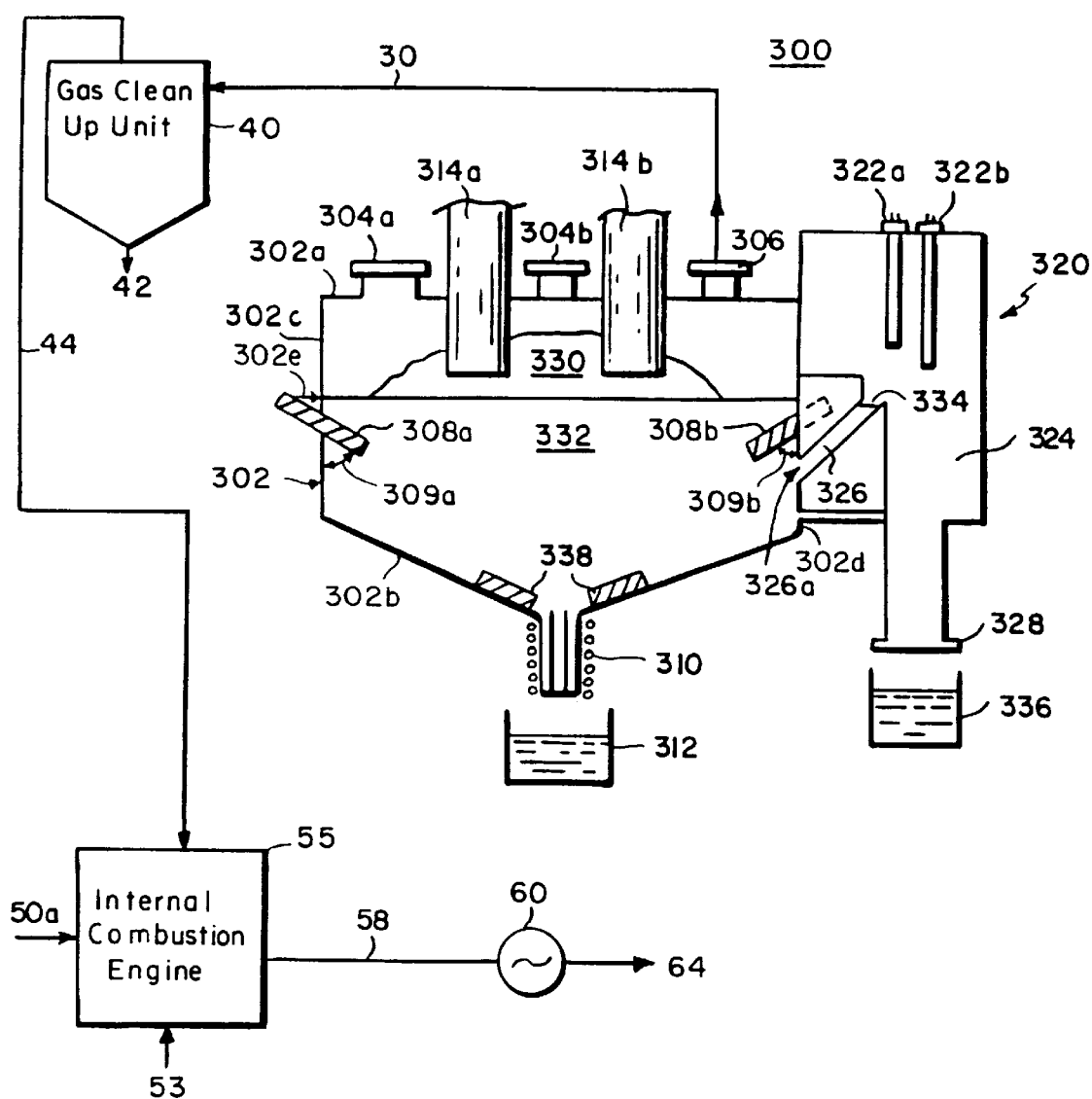
FIG. 1(b) shows a fully integrated arc plasma furnace and melter in which the melter portion electrodes are positioned at an angle relative to the vertical portion of the arc plasma-melter unit.
Figure 1C:
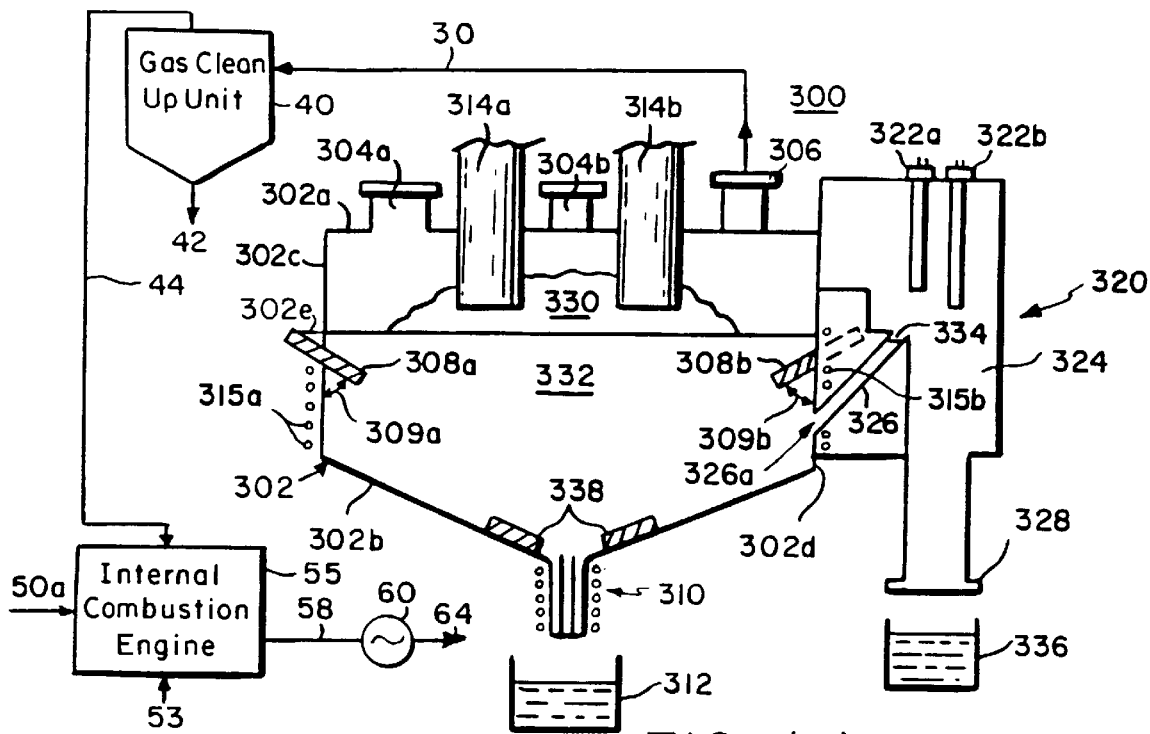
FIG. 1(c) shows the fully integrated system of FIG. 1(b) with magnetic coils for inductive heating and mixing in accordance with the present invention.
Figure 1D:
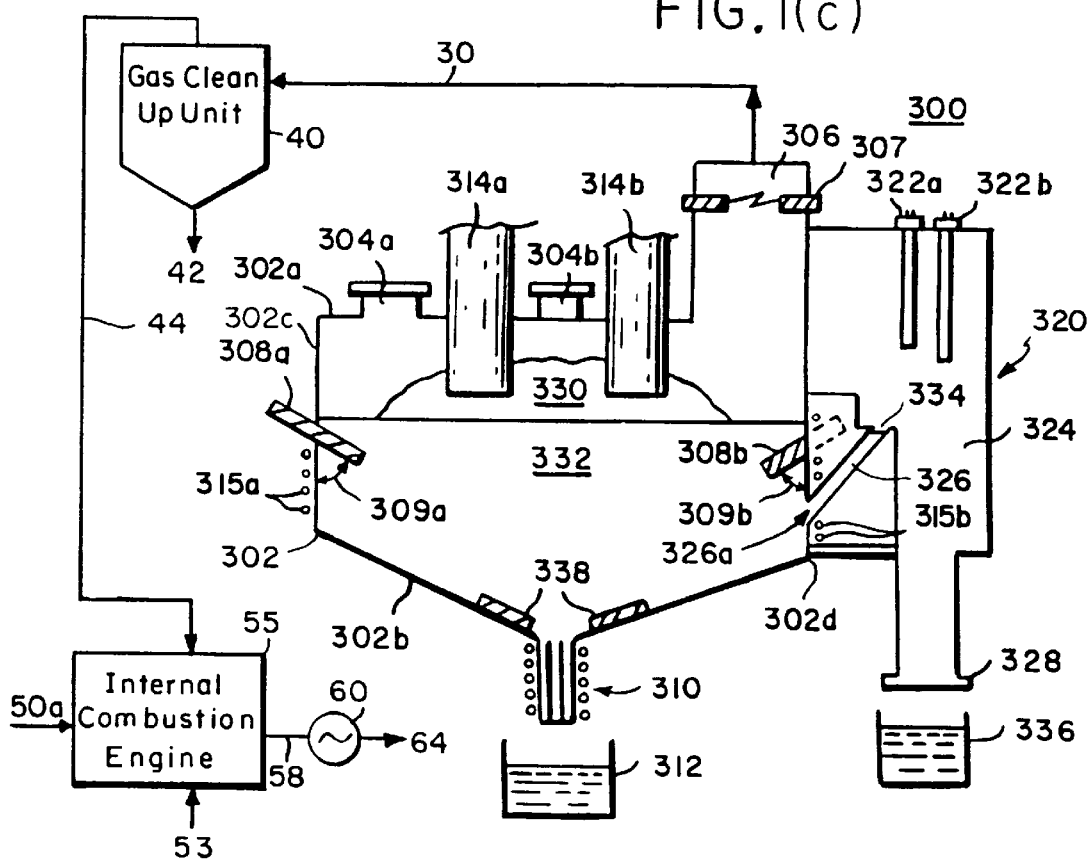
FIG. 1(d) illustrates the fully integrated system of FIG. 1(c) having a secondary thermal boost in accordance with an alternative embodiment of the invention.

To ensure self-powered operation, especially during startup, a varying amount of natural gas or other type of fuel 53 may be fed to combustor 52 (or internal combustion engine 55 as shown in FIGS. 1(b)–1(d).

Water 68 enters system 300 through pump 66 to heat recovery steam system 72, i.e., a heat exchanger where heat from hot turbine exit gas 62 exchanges to flow 70. Exhaust 74 is separated from steam 76 in heat recovery steam system 72. Steam 76 is preferably recycled as steam 78 to turbine 56 and as steam 80 to air flow 50b, as shown in FIG. 1(a) respectively.

Referring now to FIGS. 1(b)–1(d), an off-gas process similar to that shown in FIG. 1(a) is illustrated except that compressor 46, combustor 52 and gas turbine 56 are replaced by an internal combustion engine 55. Internal combustion engine 55 may be easier to utilize and may be more cost efficient than a compressor-gas turbine, especially for small tunable plasma-melter electroconversion units. Air 50a and auxiliary fuel 53 may be fed to internal combustion engine 55 in a predetermined manner based on the composition of fuel gas 44. Preferably, the efficiency of engine 55 provides sufficient electricity for all or substantially all of the electrical power required for the tunable plasma-melter electroconversion unit.

While not intended to be limiting, internal combustion engine 55 is preferably operated in a very lean mode, i.e., a high ratio of air to fuel with hydrogen-carbon monoxide gas as fuel. In this manner, electricity may be produced from hydrogen-rich gas. By operating with low equivalence ratios (fuel/air ratios relative to stoichiometric ratios) in a range of about 0.5–0.6, production of $NO_x$ may be greatly reduced, i.e. by factors of more than 100 relative to stoichiometric operation. Hydrocarbon and carbon monoxide emissions should also be very low.

Spark ignition internal combustion engines are advantageous in that such engines are less expensive for very small units and are easier to start and stop than turbines. To facilitate production of a desired level of electrical power, particularly during startup, an auxiliary power such as hydrogen-rich gas, propane, natural gas or diesel fuel may be used to power the internal combustion engine. The amount of auxiliary fuel may vary depending on the composition of the waste stream, i.e. the heating value of the incoming waste material and the amount of combustible material in the waste material and the power requirements for waste processing.

Chamber 320 includes one or more heaters 322, conduit 326, slag pouring conduit 324, port 328 and slag collector 336. In particular, due to differences in specific gravity, metal in metal/slag layer 332 moves toward bottom 302b in vessel 302. Slag in metal/slag layer 332 exits through opening or port 326a into conduit 326. Slag 334 is heated further by chamber 322a and 322b for a time sufficient to provide a homogeneous slag product. Slag 334 then passes through slag pouring conduit 324 and port 328, thereby exiting chamber 320 into slag collector 336. When hazardous waste is being processed, it may be desirable to have collector 336 sealably connected to port 328 in a manner such that air and/or gases do not enter or exit the system therethrough. Port 328 may include a flow control valve or the like to control the discharge of slag 334 from heat system 320. Auxiliary heater system 320 is utilized when it is desirable to decrease the viscosity of the slag in order to maintain the slag level in the vessel. The auxiliary heater system also compensates for heat loss as the slag approaches the slag discharge prior to dropping into the slag container.

Reaction vessel 302 also includes a plurality of AC joule heating electrodes 308a and 308b. As further shown in FIG. 1(a), electrodes 308a and 308b may be positioned across from one another on sides 302c and 302d, respectively. In addition, electrodes 308a–308b are positioned so as to be submerged in the slag 332 mix when the process is in use.

FIG. 1(b) illustrates an alternative arrangement for the positioning of electrodes 308a and 308b in accordance with the present invention. The positioning of electrodes 308a and 308b as illustrated in FIG. 1(b) facilitates replacement of the electrodes. In particular, this type of arrangement allows replacement of electrodes without the necessity of draining the furnace hearth. Draining the furnace hearth is undesirable as it often degrades the lining of the furnace. Accordingly, placing electrodes 308a and 308b at angles 309a and 309b respectively, while simultaneously preventing the escape or release of gas facilitates the replacement of electrodes as needed. While not to be construed as limiting, angles 309a and 309b of electrodes 308a and 308b relative to the respective interior sides of the furnace are preferably between about 30°–45°. It may also be desirable to utilize metallic electrodes or coated graphite electrodes for the joule heated melter. Electrodes 338 may be positioned at any angle so long as they are positioned on an interior face of the hearth. The arc plasma electrode or electrodes are preferably formed of graphite. The portion of the electrode length just above the bottom of the electrode may be coated to decrease the rate of erosion.

As further shown in FIG. 1(b), AC powered joule heating electrodes 308(a) and 308(b) are preferably inserted through sides 302c and 302d of furnace 302, respectively. As mentioned above, angles 309a and 309b of the electrodes relative to the respective interior sides of the furnace are preferably between about 30°–45°. The top end of each electrode preferably extends outside the metallic furnace enclosure and may be capped with an electrical connection which will be electrically insulated from the electrically grounded furnace shell. The bottom end of each electrode is immersed beneath the molten bath to a desired depth. By selecting the proper location of the point of entry of the electrode below the surface of the melt, no portion of the electrode will be exposed to the DC arc or radiation from this arc, thereby increasing the life of this electrode.

When it is necessary to replace electrode 308a and/or 308b, the spent electrode is withdrawn from the molten bath. If a new electrode is inserted into the bath without preheating the electrode, the cold electrode may cause the viscosity of the molten bath to increase where the electrode contacts the molten bath, thereby making it difficult to insert this new electrode into the molten bath. Accordingly, it may be desirable to also electrically energize this electrode by using a special electrically isolated, current limited power supply which will safely provide additional heat at the junction of the bath and the electrode to fully permit immersing the new electrode into the bath. In a preferred embodiment, suitable electrical and thermal insulation may also be provided to each electrode so that each electrode will be insulated both thermally and electrically from the metallic furnace enclosure during normal operation.

FIG. 1(c) illustrates another embodiment of the present invention in which magnetic coils 315a and 315b may be utilized for inductive heating and/or mixing. In order to provide the optimum rate of melting commensurate with the particular waste stream being introduced into the combined DC arc plasma-melter, additional stirring or mixing beyond that normally produced by the melter portion of the furnace and the DC arc portion of the furnace may be desirable. This may be accomplished by the addition of strategically placed magnetic coils such as coils 315a and 315b to create greater J×B forces which in turn causes additional mixing and/or heating in the molten bath. Coils 315a and 315b may be positioned within the metal shell of the furnace, but behind the refractory lining of the melt pool. Alternatively, if the furnace shell is fabricated of non-magnetic stainless steel such as 304L or 316 grade, the coils may be placed on the exterior of the shell. Coils 315a and 315b are connected to an AC power supply source. The frequency of the power supply source may vary depending on the material. This enhancement of bath mixing is an example of the type of "tuning" which may increase furnace electrode life and waste throughput.

The same features of tunability of the mix of the surface and volume heating that apply to the use of a joule heated melter apply to the use of the inductively heated melter in conjunction with the plasma. In a preferred embodiment, inductive heating capabilities are provided with the arc plasma-joule heated melter system as shown in FIG. 1(c). For some types of waste processing, it may be desirable to operate with only arc plasma and inductive heating. A representative system of this embodiment would be the same as that illustrated in FIG. 1(c) without joule heating electrodes.

FIG. 1(d) illustrates another embodiment of the present invention in which an alternative configuration of the plasma melter process incorporates a secondary thermal boost system 307. This system may be an arc plasma in a chamber to provide the necessary thermal energy to further crack condensable fractions exiting the primary plasma-melter process. As shown in FIG. 1(d) for example, secondary thermal boost system 307 may be placed proximate to or within port 306.

Conversion of waste to electrical energy for the plasma melter process depends on maximum conversion of solid and liquid wastes to gaseous product gas. In pyrolysis processes, a portion of the exiting gas may contain condensables that are light to medium weight oils. If the gas exiting the primary plasma-melter chamber is allowed to cool, liquefaction of a portion of the off-gas may result due to the condensables present at furnace temperatures. The secondary plasma off-gas chamber ensures that these oils are converted to noncondensible combustible gases resulting in an enhanced recovery of energy value from the incoming waste materials.

When secondary plasma chamber 307 is positioned as shown in FIG. 1(d), the gas exiting the primary furnace chamber does not decrease in temperature before entering the secondary plasma chamber 307 because the two systems are directly coupled. This minimizes the overall energy requirements for the cracking and gasification processes.

In addition to enhanced energy recovery in the gaseous effluent of the arc plasma melter process, the plasma off-gas chamber 307 further eliminates toxic species that are not destroyed in the primary furnace chamber. This enhances the effectiveness of the process to destroy all precursor species such as for the formation of furans and dioxins. Additionally, when treating volatile and semi-volatile toxic organics, the secondary plasma chamber can effectively destroy all toxic species. Because all condensable species exiting the furnace are converted to a combustible gas in the secondary plasma chamber, secondary waste generation is minimized. It should be appreciated that the plasma off-gas chamber may not always be required, but may be independently controlled during the process.

Figures 4A, 4B:
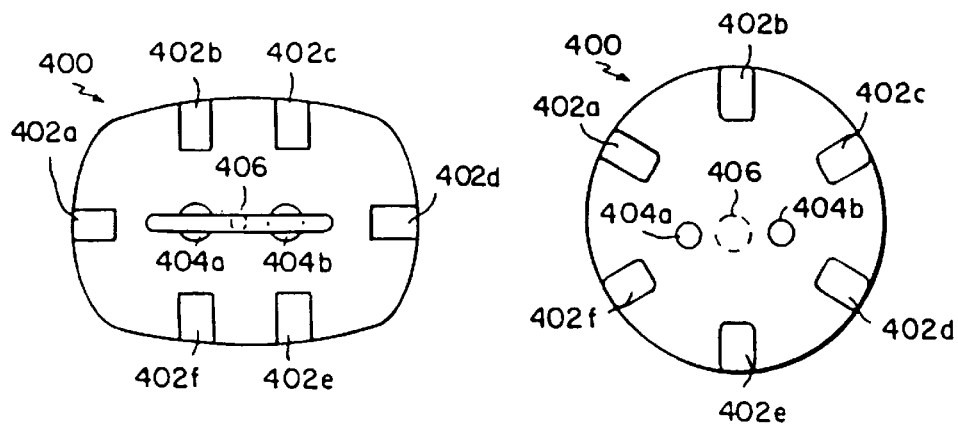
FIGS. 4(a) and 4(b) show two plan views for electrode configurations and geometries for the fully integrated system shown in FIG. 2.

DC electrodes 314a and 314b which are preferably formed of graphite, are provided within reaction vessel as shown in FIG. 4(a) or 4(b). It is preferred to use graphite as electrode material rather than metal since graphite electrodes simplify the process and have much higher current capability than those used in a metal torch. In addition, graphite electrodes require less maintenance relative to the frequent tip replacements of the metal torch systems. Due to the anticipated conditions in the furnace plenum involving both partial oxidizing environments and conditions promoting the water-gas reaction:

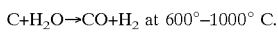
$C+H_2O \rightarrow CO+H_2$ at 600°–1000° C.

there may be unacceptable consumption of graphite without special provisions. Therefore, graphite electrode(s) 314 is preferably coated with zirconia, silicon carbide, boron nitride or another protective coating to minimize graphite consumption and prolong useful life. For example, when municipal solid waste containing carbonaceous material is fed to vessel 302, a highly endothermic reaction occurs requiring approximately 600 kW-hours/ton municipal solid waste to convert combustible material to fuel gas and incombustible material to slag.

Figure 2:
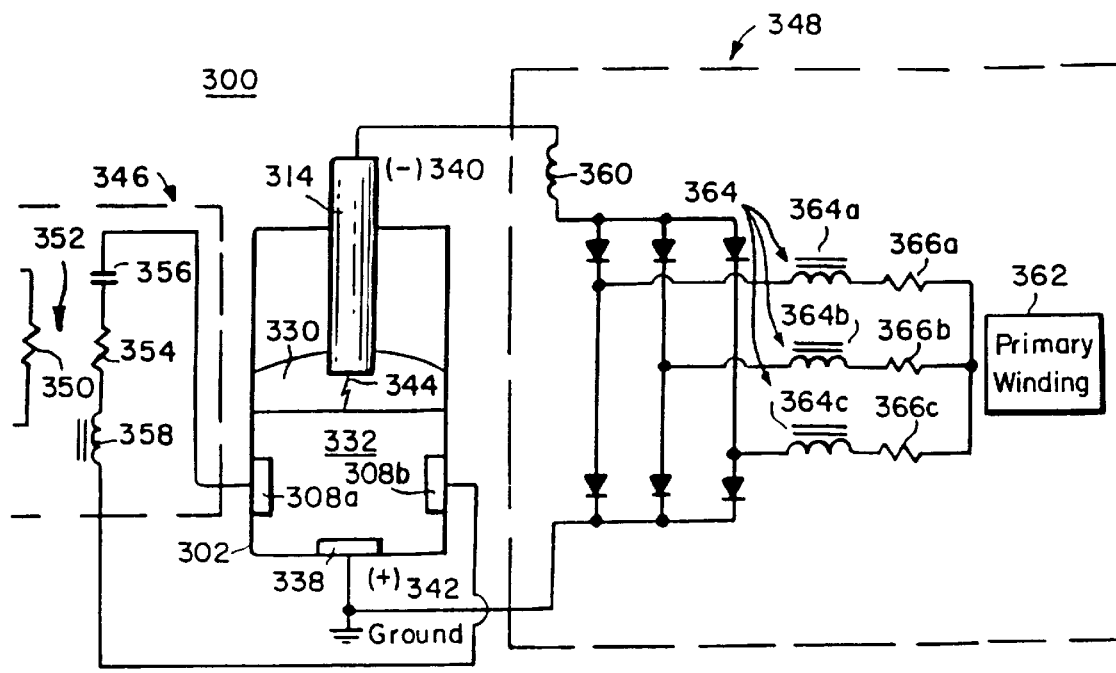
FIG. 2 illustrates a fully integrated arc plasma furnace and joule heated melter system with independently controllable power delivery systems.

Electrode or electrodes 314 may be operated with either an AC or DC arc in vessel 302. It is preferred however, to utilize a DC arc in vessel 302 rather than an AC arc as the use of a DC arc enhances arc stability and can reduce electrode consumption. As shown in FIG. 2, the electrode(s) 314 supply arc 344 which contacts feed material 330. One or more additional electrodes 338 may be provided as shown in FIGS. 1 or 2 such that negative (−) 340 and positive (+) 342 outputs are formed thereby.

Figure 6A:
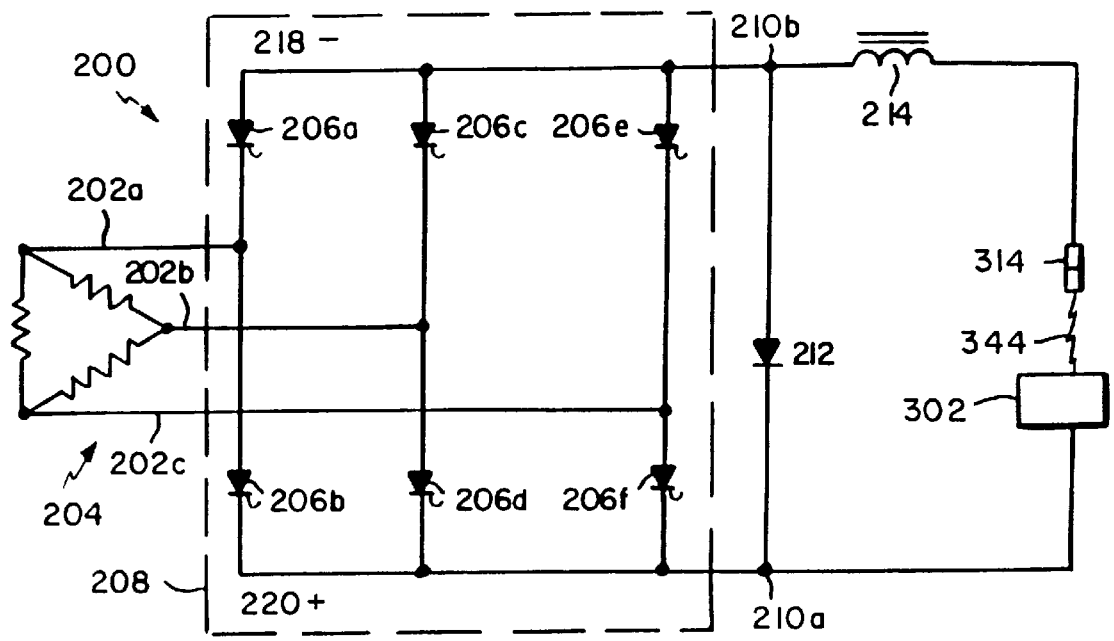
FIGS. 6(a) and 6(b) illustrate DC power system arrangements for the ac plasma portion of the systems of the present invention.
Figure 6B:
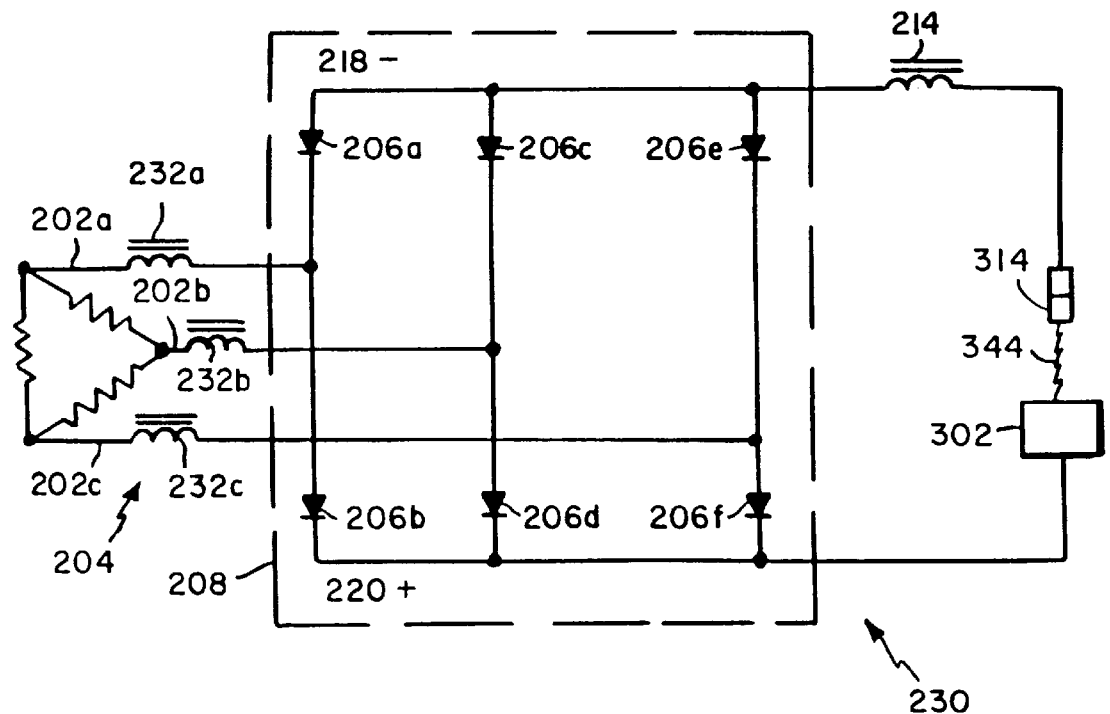

Two types of power supply arrangements suitable for use in the present invention to convert three phase AC power into DC power in order to initiate and maintain a stable DC arc(s) are shown in FIGS. 6(a) and 6(b). As shown in FIG. 6(a), a conventional three phase thyristor bridge type rectifier 200 with a "floating" or "clamping" diode 212 is illustrated. Secondary transformer winding 204 provides an AC voltage to thyristors 206a, 206b which rectify first phase 202a. Similarly, secondary transformer winding 204 provides an AC voltage to thyristors 206c, 206d which rectify second phase 202b while secondary transformer winding 204 provides an AC voltage to thyristors 206e, 206f which rectify third phase 202c. In this manner, a rectified phase designated as 208 in FIG. 6(a) is provided across points 210a and 210b.

"Clamping" diode 212 is connected between (−) 218 and (+) 220 outputs of the bridge rectifier. Inductor 214 is connected in series with an ungrounded output cable between "clamping" diode 212 and vessel 302. Inductor 214 is used to supply transient voltage frequently required to maintain a stable arc 344 during operation of vessel 302. The function of "clamping" diode 212 is to provide a path for the current from inductor 214 to flow when the voltage of DC arc 216 exceeds the open circuit voltage of the rectifier.

Referring now to FIG. 6(b), another conventional circuit 230 to convert three phase AC power to DC power which is suitable for use in the present invention is shown. This type of circuit is suitable for use in sustaining a DC arc 344 in vessel 302 and is frequently utilized in DC arc welding systems. In the circuit shown in FIG. 6(b), saturable reactors 232a, 232b and 232c are connected in series with each of the three AC secondary transformer windings and the three phase diode rectifier bridge. The function of saturable reactors 232a, 232b and 232c is to vary the impedance of the AC current path between the transformer and the AC input to the diode rectifier, thereby providing a means to maintain the desired amount of DC current in arc 344 even though the arc voltage may be varying rather rapidly.

Secondary transformer winding 204 in circuit 230 shown in FIG. 6(b) may be wye or delta. If secondary winding 204 is wye, then the primary winding (not shown in FIG. 6(b)) must be delta or be wye with or without a neutral return.

A "clamping" diode is not necessary in the type of circuit shown in FIG. 6(b) because the diodes in the bridge rectifier provide this function. Inductor 214 is used to supply the transient arc voltage necessary in order to maintain a stable DC arc in the vessel.

It is important that either the thyristor type or saturable reactor type of rectifier have a sufficiently high open current DC voltage to normally exceed the DC arc voltage. It is also important that either type of power supply must be capable of holding a preset magnitude of DC current while the arc voltage ranges from zero to at least 90% of normal open circuit rectifier voltage even if the arc voltage is varying rapidly.

If the arc portion of vessel 302 is powered with AC rather than DC power, then the saturable reactor type of circuit shown in FIG. 6(b) is preferred since it will provide a greater degree of arc stability than a conventional thyristor type of AC switch.

Contact with the arc and the specific gravity of metals present in waste material 330 results in the formation of three phases or layers in vessel 302: a metal layer, a slag layer and a gaseous layer. The primary mode of operation in vessel 302 is pyrolysis. However, operation in a partial oxidation mode may be required to assist in the processing of large quantities of combustible materials.

One configuration of integrated system 300 involves the use of capacitors 356 and a specific arrangement in the distribution of power. As shown in FIG. 2, a single phase joule heated arc plasma-melter 302 having a single pair of electrodes 344 and 338 for arc 314 is illustrated. Preferably, the joule heated portion of melter 302 utilizes AC power supply 346 while the arc portion of melter 302 utilizes DC power supply 348.

The preferred embodiment shown in FIG. 2 utilizes the combination of the DC and AC power systems 346, 348 respectively, supplying power to electrodes in the single vessel or melter tank 302 in which waste material 330 is undergoing treatment by a conversion process, including vitrification. A special circuit is necessary because DC arc current 314, 338 will interact with joule heating AC electrodes 308a, 308b unless special steps are taken to prevent such interaction. Such interaction can cause failure of the transformers which provide power to the joule heating electrodes. This circuit allows fully independent control of the arc plasma and joule heated melter.

If single- phase, two-phase, or three-phase AC arcing electrodes are utilized instead of DC arcing electrodes, there may still be interaction between the AC arc circuit and the joule heating AC circuit. While the AC—AC interaction is quite complex, there are many dependent interactions which can occur, and under these circumstances, it is often difficult to control localized heating and electrode erosion. Accordingly, it is preferred to utilize a DC arc circuit in combination with a joule heated AC circuit.

DC power supply 348 includes inductor 360, primary winding 362, secondary windings, 366a, 366b and 366c and saturable reactors 364a, 364b and 364c. Primary winding 362 is preferably delta. Saturable reactors 364a, 364b and 364c are connected in series respectively with secondary windings 366a, 366b and 366c.

If DC current 348 passes through waste material 330 and slag/metal melt pool 332 having submerged joule heating AC electrodes 308a, 308b connected directly to the terminals of transformer 352 with no means of blocking the flow of DC current 348 through the windings of transformer 352, the core of transformer 352 saturates. This results in increased current in primary winding 350 of transformer 352 causing transformer 352 to fail in a very short time period. In order to simultaneously operate the arc plasma and the joule heated melter in vessel 302, it therefore is necessary to continue to pass AC current 346 through melt pool 332 for joule heating, while simultaneously blocking DC current flow 348. Capacitor 356 is utilized to block DC current 348 and pass AC current 346. Capacitor 356 preferably is connected in series with each transformer secondary winding 354 in order to balance the current in each of the phases over a wide range of furnace operating conditions. As further shown in FIG. 2, capacitor 356 is connected to secondary winding 354, which is connected to saturable reactor 358.

Figures 3A, 3B:
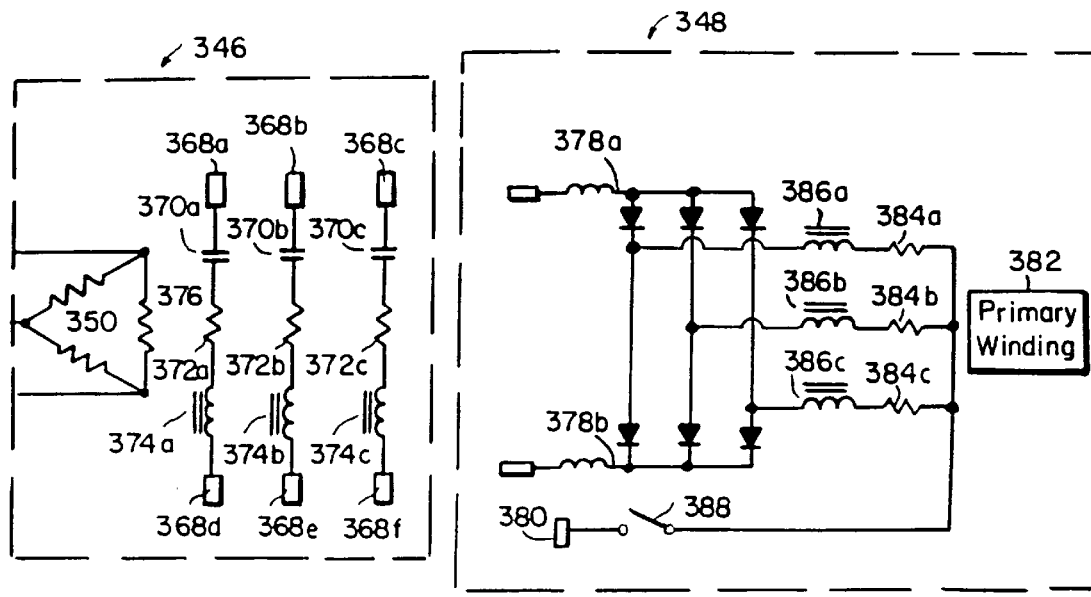
FIGS. 3(a) and 3(b) respectively show an AC power system and a DC power system for use with the fully integrated systems 2.

FIGS. 3(a) and 3(b) show a circuit arrangement which is suitable for use in the present invention. In particular, three phase AC power supply 346 is illustrated in FIG. 3(a) while DC power supply 348 is illustrated in FIG. 3(b). The circuit includes the inductance of each AC current path in vessel or melter 302 as reflected through the entire AC power system 346, the non-linear resistance of the current path through melt pool or molten bath 332, the electrode interfaces, the power feed cables, and secondary windings 372a, 372b and 372c of transformer 376 and the magnitude of the capacitance of capacitors 370a, 370b and 370c which is connected as a series element in the joule heating furnace circuit. AC power 346 also includes primary winding 350, saturable reactors 374a, 374b and 374c and electrodes 368a–368f. Saturable reactors 374a–374c are connected respectively to secondary windings 372a–372c.

Because the AC current is rarely sinusoidal in a circuit having in series with a non-linear resistor such as the joule heating furnace circuit, it is possible to excite several harmonic frequencies other than 60 Hertz, which are superimposed on the 60 Hertz sine wave supplied by the utility company. In this circuit, it is important to account for the non-linear resistance and to specify the electrical components to achieve adequate damping and therefore stable operation. It is also important that the voltage, current, and capacitance ratings of the capacitor are such that the series resonant frequency of the entire system inductance at the furnace electrodes is such that the lowest value of resistance as seen at these same electrodes when looking into the furnace plus the effective 60 Hertz resistance is equal to or greater than 1.5 and preferably 2 times greater than the $(L/C)^{1/2}$ where L is the total inductance of the power system and C is the capacitance of capacitors 370a, 370b and 370c. The total effective resistance R should be 2 times $(L/C)^{1/2}$, but any resonant rise in current is negligible if this is 1.5 times $(L/C)^{1/2}$.

As shown in FIG. 3(b), DC electrical system 348 may have a power transformer with a wye or delta secondary winding 384a–384c. Primary winding 382 is preferably delta. As also shown in FIG. 3(b), the power rectifier is preferably a three-phase full wave rectifier. The rectifier may be a current controlled thyristor rectifier as shown in FIG. 6(a), i.e., a silicon-controlled rectifier in which the anode-cathode current is controlled by a signal applied to a third electrode. Alternatively, the rectifier may be three-phase full wave diode rectifier with the DC current control to maintain the desired DC current such as that illustrated in FIG. 6(b). If a thyristor rectifier is utilized, it is important that a full-rated current floating diode be placed across DC output terminals 378a, 378b. It is not necessary to add a DC "floating" or "clamping" diode when using a three-phase rectifier since the diodes in the rectifier will suffice.

For a DC arc furnace, it is preferable to use a three-phase full wave diode rectifier with saturable reactor control 386a–386c. Regardless of which type of power supply is used, it is important that an inductor is connected in series with the DC power lead which is not grounded. This reactor is necessary to rapidly supply the energy when the furnace conditions are such that the DC arc voltage suddenly increases.

Refractory is utilized to line vessel 302. Refractory may be formed of any suitable material capable of handling temperatures required to process the waste material. For example and while not meant to be limiting, vessel 302 and portions of the refractory may be formed of ceramic or graphite.

If the bottom of the inside of furnace or melter 302 is made of suitable refractory such as ceramic or the like and is a poor electrical conductor when hot, counter electrode 380 may be formed by depressing a portion of the floor of furnace 302 between joule heating electrodes 368a–368f and then slightly elevating the molten metal drain tube so that a pool of metal remains in this depression in the furnace floor even after the metal is drained. This metal may act as a counter electrode 380 for the AC joule heating circuit and may simultaneously be used as a DC arc circuit electrode.

Metallic furnace bottom electrode 380 may be connected using various configurations such as that shown by the circuit diagrams in FIG. 3(b). In any case, it is preferred to have one or more electrodes through the bottom of the furnace or melter. The electrodes may be graphite or metal. It should be noted that the circuits in FIG. 3(b) and FIG. 5 respectively include switches 388 and 436 in series with the electrical connection to metallic electrode 380 and 426. The function of these switches is to permit the DC arc or arcs to operate in either the transfer or non-transfer mode or a combination of both modes simultaneously.

If the physical configuration of furnace 302 (shown in FIG. 1–2) is suitable for the use of two independently positioned controllable electrodes, then the DC arc electrodes and the AC joule heating electrodes may be operated simultaneously with no detrimental electrical interaction but with beneficial interaction for vitrification of all types of waste, including hazardous wastes and hospital waste.

The electrode configurations in furnace or vessel 400 shown in the embodiments of the invention in FIGS. 4(a) and 4(b) are suitable for use for remote control installations. FIG. 4 illustrates two sketches showing different plan views for the furnace construction. FIG. 4(a) shows an elongated construction while FIG. 4(b) shows a round construction. While both configurations can use one, two, or more solid graphite electrodes, it is preferred to use the elongated configuration with two electrodes (as shown in FIG. 4(a)), since this design lends itself to two separate small diameter electrode elevating systems, each housed in its own cylindrical enclosure. Any or all of the joule heating electrodes 402a–402f can be connected to the series capacitor as counter electrodes 404a–404b for the DC arc system. Joule heating electrodes 402a–402f may also be connected in series with electrode 406. In this case, switch 388 is also included as shown in FIG. 3(b). By adjusting the amount of AC current such that its peak value exceeds that value of DC arc current carried by joule heating electrodes 404a–404f, there will always be a current reversal which will tend to minimize polarization at these electrodes.

Figure 5:
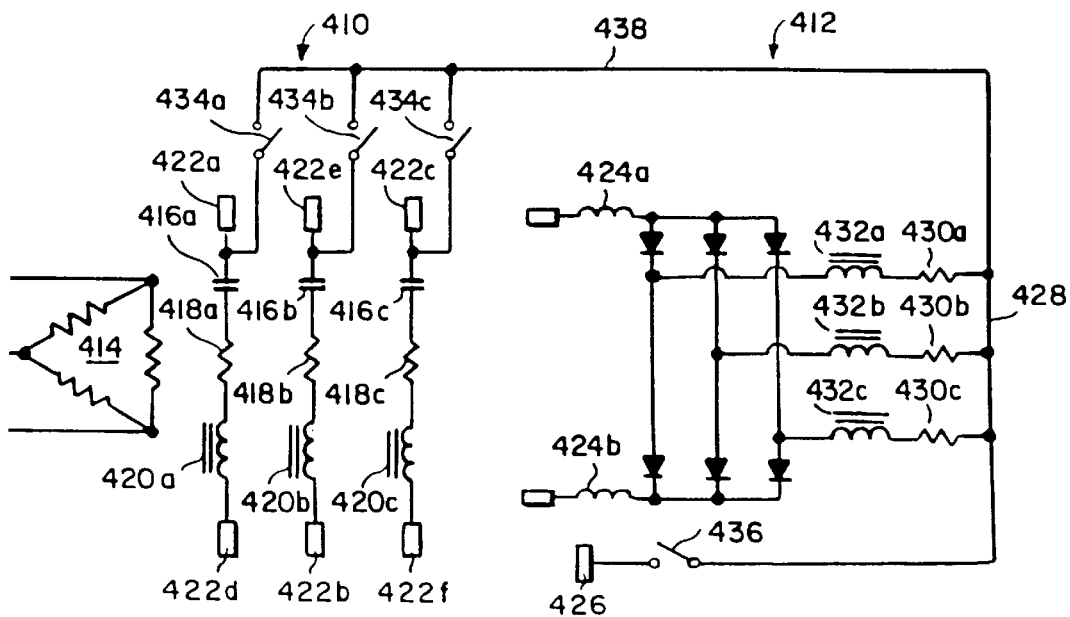
FIG. 5 illustrates a circuit diagram having the ability to connect a portion of the AC electrodes that will conduct both AC and DC according to the integrated system.

Depending upon the type of waste material being processed, it may be desirable to connect DC power supply 412 system neutral 438 to AC joule heating electrode 422a, 422e and 422c, which are the electrodes connected to AC capacitors 416a–416c respectively and which are used to block DC current flow through the secondary windings 418a–418c of the transformers as shown in FIG. 5. The connection of DC power supply 412 and AC power supply 410 is designated in FIG. 5 as line 438. The reason for using this connection is to provide three additional DC counter electrodes closer to the surface of melt pool 332 during warm up of the furnace so that neutral DC transfer current 428 can flow and assist in stabilizing the positive (+) and negative (−) DC arcs before the material directly above the counter electrode on the hearth has become sufficiently hot to conduct sufficient DC current to assist in stabilization of the DC arcs.

It is also desirable to have three switches 434a–434c in series with the neutral and electrodes 422a, 422e and 422c in order to control the magnitude of the DC and AC current between electrodes 422a–422f. AC power supply system 410 includes primary winding 414 and secondary windings 418a–418c connected respectively to saturable reactors 420a–420c. DC power supply 412 includes inductors 424a, 424b and secondary windings 430a–430c connected respectively to saturable reactors 432a–432c.

Joule heating AC power supply 410 of a glass melt tank provides near constant melt temperatures throughout the glass tank, thereby minimizing sizing constraints for the arc, i.e., arc power, electrode diameter, and the like. The DC arc is primarily present in the furnace-melter for feed rate enhancement. This makes this newly configured melter technology more flexible than any other available vitrification system. The arc supplies the energy in the unmelted overburden of incoming feed, and the joule heated portion of the melter system maintains the hot glass pool to ensure complete dissolution and mixing of the glass mixture.

If the arc technology was used alone, the electrode hearth diameter ratio would have to be large to ensure that the contents in the hearth are melted sufficiently not only at the center of the hearth, but also at the walls of the hearth. The size of the hearth therefore would be limited due to practical limitations on electrode diameter. When the hearth or glass tank is joule heated, however, this limitation no longer exists and the tank can be sized to ensure the residence time is adequate for complete mixing and dissolution of all glass components.

If the melter technology were employed without the arc, the feed rates would be much lower due to limitations in heat transfer from the melt pool to the unmelted feed above the molten glass. To accommodate large throughput requirements, the standard approach is to increase the melt surface area. Accordingly, for a given processing rate, the joule heated melter would need to be much larger than the combined arc melt system of the present invention. The present invention utilizes the benefits of both the DC arc and AC joule heated melter technologies, and does so in a single optimized system.

Multiple arc electrodes may be used to start or restart this combined system, but once the melt is heated, joule heating may be used to maintain a molten bath during long idling periods. This means that the arc may be initiated immediately in the transferred mode for start or restart of arc operations.

The combination of the arc plasma furnace and joule heated melter in accordance with the present invention provides a method of quickly heating feed waste material resulting in higher processing rates for a given sized process. The fast heating rate also results in the production of a higher quality of pyrolysis gas. More energy is recovered and there are less pollutants in the gas emissions.

Additionally, the joule heated melter of the present invention provides a larger reservoir with demonstrated mixing to produce a homogeneous glass product with very high stability. This is beneficial since vitrified glass product is stable over geologic time frames. See e.g., Buelt et al., *In Situ Vitrification of Transuranic Wastes: Systems Evaluation and Applications Assessment,* PNL-4800 Supplement 1, Pacific Northwest Laboratory, Richland, Wash. (1987). Additionally, the present invention provides further volume reduction through the vitrification of the ash as compared with that ash that would be generated from incineration alone. See, Chapman, C., *Evaluation of Vitrifying Municipal Incinerator Ash, Ceramic Nuclear Waste Management IV,* Ceramic Transactions, G. G. Wicks, Ed., Vol. 23, pp.223–231, American Ceramic Society (1991).

As discussed above, the present invention provides a method which facilitates fast pyrolysis. Fast pyrolysis results in a pyrolysis gas having higher purity than other means of pyrolysis. The high purity gas facilitates use with recently developed high efficiency small gas turbine technology, thereby significantly increasing efficiency as compared with conventional steam turbines and decreasing the unit size of the turbine required. The DC arc provides a high temperature heat source to accomplish the fast pyrolysis effectively. Graef, et al., *Product Distribution in the Rapid Pyrolysis of Biomass/Lignin for Production of Acetylene,* Biomass as a Nonfossil Fuel Source, American Chemical Society (1981) have shown that under conditions such as those found in a plasma furnace, municipal solid waste can be pyrolyzed into a gaseous product as shown in Table 1.

TABLE 1

Gas Composition from Pyrolysis of MSW in Plasma Furnace

| | Fast Pyrolysis | Normal Pyrolysis |
|---|---|---|
| Percent Conversion to useful gas for combustion | >65% | 45%–50% |
| Gas Species | | |
| $CO_2$ | 2% | 10% |
| CO | 44% | 50% |
| $H_2$ | 43% | trace |
| $CH_4$ | 2% | 38% |
| Light HC's | bal | bal |
| HHV (BTU/SCF) | 350–400 | 300–350 |

It is important to note that in comparing normal pyrolysis to that of fast pyrolysis, a greater fraction of the incoming waste is converted to gas. Thermal or normal pyrolysis promotes liquefaction giving only 45–50% conversion to pyrolysis gases, while fast pyrolysis has gas yields of greater than 65%. Fast pyrolysis of municipal waste has been demonstrated using a water cooled, metal plasma torch. See, Carter, et al., *Municipal Solid Waste Feasibility of Gasification with Plasma Arc, Industrial and Environmental Applications of Plasma,* Proceedings of the First International EPRI Plasma Symposium (May 1990). In the partial oxidation mode of operation, the residue from both techniques is oxidized to offset the pyrolysis energy requirements.

The pyrolysis gases produced in accordance with the present invention are expected to be well suited for combustion in a state of the art, high efficiency gas turbine generator. With the efficiency of new gas turbine-combined cycle systems approaching 50%, the present method of waste-to-energy conversion provides an effective alternative to standard waste incinerators. Under favorable conditions, the incinerator-steam generator systems achieve 15–20% efficiency in the conversion of the potential energy contained in the waste to usable electric energy.

A prophetic illustrative comparison of the complete waste conversion system of the present invention to that of standard incinerator-steam generator systems is summarized in Table 2.

TABLE 2

Relative Energy Balances and Net Cost Information for Arc Furnace and Joule Heated Melter vs. Standard Incinerator-Steam Generator Technology (Basis = 1 ton MSW)

| | Arc Furnace-Melter | Incinerator |
|---|---|---|
| Energy requirements to operate system | $2.1 \times 10^6$ BTU | — |
| HV in Incoming MSW | $1 \times 10^7$ BTU | $1 \times 10^7$ BTU |
| Losses | $3.1 \times 10^6$ BTU | $8.8 \times 10^6$ BTU |
| HV in Exiting Gas | $9 \times 10^6$ BTU | — |
| Efficiency for electrical conversion | 0.4 | 0.15 |
| Net Energy (Electric Produced) | $1.5 \times 10^6$ BTU | $1.5 \times 10^6$ BTU |
| Value of Electricity ($0.05/Kwh) ($) | 22.00 | 22.00 |
| Disposal Costs including transportation ($) | — | 15.00 to 75.00 |
| Net Cost/Income ($) | (+)22.00 | (+)7.00 to (-)53.00 |

HV = heat value; MSW = municipal solid waste.

An assumption is made for the comparison of the two technologies, namely that the glass or slag product produced in the arc furnace of the present invention is a useful product, although no value has been assigned to the glass for this comparison. At a minimum, however, this material is a stable nonhazardous material that can be easily disposed of in any non-hazardous landfill. It is also assumed that the municipal solid waste (MSW) incinerator employed in a highly populated area such as the Northeastern United States produces ash that either must be shipped to a standard landfill or a hazardous waste landfill. Energy and cost are given per ton of MSW processed based on currently available data.

The energy requirements to operate the system are given in a relative bases, i.e., the value shown as "energy requirements to operate system" for the arc furnace-melter is that in excess of what is required for the incinerator. The incoming heating value of the waste is a composite value from multiple references. See e.g., Carter, et al., *Municipal Solid Waste Feasibility of Gasification with Plasma Arc, Industrial and Environmental Applications of Plasma,* Proceedings of the First International EPRI Plasma Symposium (May 1990); *Renewable Energy—Sources for Fuels and Energy,* Johansson, Editor, Island Press, Washington, D.C. (1993); and *Clean Energy from Waste & Coal,* Khan, Editor, American Chemical Society Symposium Series, American Chemical Society, Washington, D.C. (Aug. 1991, published 1993). The net energy produced for either option was determined using a 40% and 15% efficiency for the arc furnace-melter-gas turbine generator, and incinerator-boiler-steam turbine generator options, respectively. See, *Clean Energy from Waste & Coal,* Khan, Editor, American Chemical Society Symposium Series, American Chemical Society, Washington, D.C. (Aug. 1991, published 1993); and *Perry's Chemical Engineers' Handbook,* 6th Ed., Ch. 26. The losses presented in Table 2 are the difference between incoming heat value in the waste and the energy input minus the net energy out. Losses for the incinerator option are higher due to the inefficiencies of the combination of the boiler and steam generator as opposed to pyrolysis gas fired turbine generators. See, *Perry's Chemical Engineers' Handbook,* 6th Ed., Ch. 26. The disposal costs for the ash represent values obtained from literature and data currently available from waste handling facilities. See e.g., *Recycling and Incineration,* Dension, et al., Ed., Island Press, Washington, D.C. (1990). If new rulings and current trends involving the handling of ash as a hazardous waste continue, the disposal costs would be in the high end of the range given in Table 2. Under these circumstances, the present invention of utilizing the arc furnace-melter combination provides an additional advantage over the prior art.

It should be appreciated by those skilled in the art that the specific embodiments disclosed above may readily be utilized as a basis for modifying or designing other structures for carrying out the same purpose of the present invention. It should also be realized by those skilled in the art that such equivalent constructions do not depart from the spirit and scope of the invention as set forth in the appended claims.

What is claimed is:

1. An integrated arc plasma-joule heated melter waste conversion unit, comprising:
    at least one arc plasma electrode;
    a first power supply source connected to the at least one arc plasma electrode and characterized in that an arc plasma generated between the at least one arc plasma electrode and a molten pool in the unit is on top of or within the molten pool;
    a plurality of joule heating electrodes; and
    a second power supply source connected to the plurality of joule heating electrodes and configured to provide volumetric joule heating in the molten pool;
    wherein the first and second power supply sources are configured such that during simultaneous operation, the first and second power supplies are separately and independently controlled without detrimental electrical interaction with one another.

2. The integrated arc plasma-joule heated melter waste conversion unit of claim 1, wherein the second power supply source is an AC power supply source, comprising:
    at least one transformer having at least one primary winding and at least one secondary winding;
    at least one capacitor connected in series with the at least one secondary winding of the transformer and connected to a first of the plurality of the joule heating electrodes; and
    at least one saturable reactor connected in series with the at least one secondary winding of the transformer and connected to a second of the plurality of joule heating electrodes.

3. The integrated arc plasma-joule heated melter waste conversion unit of claim 1, wherein the first power supply source is a DC power supply source.

4. The integrated arc plasma-joule heated melter waste conversion unit of claim 3, wherein the DC power supply source is configured to provide stable transfer arc operation.

5. The integrated arc plasma-joule heated melter waste conversion unit of claim 1, wherein the number of arc plasma electrodes is two.

6. The integrated arc plasma-joule heated melter waste conversion unit of claim 1, wherein the number of arc plasma electrodes is greater than two.

7. The integrated arc plasma-joule heated melter waste conversion unit of claim 1, wherein six joule heating electrodes are positioned in the unit, the six joule heating electrodes each connected to the second power supply source and configured to provide volumetric joule heating in the molten pool.

8. The integrated arc plasma-joule heated melter waste conversion unit of claim 1, wherein the unit is in the form of an elongated chamber.

9. The integrated arc plasma-joule heated melter waste conversion unit of claim 8, wherein the number of arc plasma electrodes is two.

10. The integrated arc plasma-joule heated melter waste conversion unit of claim 8, wherein the number of arc plasma electrodes is greater than two.

11. The integrated arc plasma-joule heated melter waste conversion unit of claim 9, wherein six joule heating electrodes are positioned in the elongated chamber, the six joule heating electrodes each connected to the second power supply source and configured to provide volumetric joule heating in the molten pool.

12. The integrated arc plasma-joule heated melter waste conversion unit of claim 1, wherein the first power supply source is a DC power supply source comprising:
    at least one transformer having at least one primary winding and at least one secondary winding;
    at least one saturable reactor having a first end and a second end, the first end of the at least one saturable reactor connected to the at least one secondary winding of the transformer;
    rectification means having at least one AC input terminal and first and second DC output terminals, the at least one AC input terminal connected to the second end of the at least one saturable reactor, the first DC output terminal connected to a counter electrode in the unit; and
    an inductor having a first end and a second end, the first end connected to the second terminal of the DC output of the rectification means and the second end connected to the at least one arc plasma electrode.

13. The integrated arc plasma-joule heated melter waste conversion unit of claim 12, wherein the DC power supply source is configured to provide stable transfer arc operation.

14. The integrated arc plasma-joule heated melter waste conversion unit of claim 1, further including at least one metal discharge port and at least one slag discharge port in predetermined positions in the unit.

15. The integrated arc plasma-joule heated melter waste conversion unit of claim 12, wherein the metal discharge port is positioned proximate to a bottom surface of the unit.

16. The integrated arc plasma-joule heated melter waste conversion unit of claim 14, wherein the slag discharge port extends upwardly at a predetermined angle relative to a side surface of the unit and wherein the slag discharge port is positioned above a bottom surface of the unit and below a surface of the molten pool.

17. The integrated arc plasma-joule heated melter waste conversion unit of claim 16, further including an auxiliary heating chamber attached to the slag discharge port.

18. The fully integrated arc plasma-joule heated melter waste conversion unit of claim 1, wherein the at least one arc plasma electrode is a graphite electrode.

19. The integrated arc plasma-joule heated melter waste conversion unit of claim 18, wherein the at least one arc plasma electrode includes a protective coating.

20. The integrated arc plasma-joule heated melter waste conversion unit of claim 1, further including a plurality of inductive heating and/or mixing coils in a predetermined position relative to the unit.

21. The integrated arc plasma-joule heated melter waste conversion unit of claim 1, wherein the plurality of joule heating electrodes are positioned at predetermined distances from a bottom surface of the unit.

22. A system for converting waste material to useful energy and/or solid product, the system comprising:
an integrated arc plasma-joule heated melter waste conversion unit, the unit comprising:
(a) at least one arc plasma electrode;
(b) a first power supply source connected to the at least one arc plasma electrode and characterized in that an arc plasma generated between the at least one arc plasma electrode and a molten pool in the unit is on top of or within the molten pool;
(c) a plurality of joule heating electrodes;
(d) a second power supply source connected to the plurality of joule heating electrodes and configured to provide volumetric joule heating in the molten pool;
wherein the first and second power supply sources are configured such that during simultaneous operation, the first and second power supplies are separately and independently controlled without detrimental electrical interaction with one another;
(e) a first discharge port positioned to discharge gases from the unit;
(f) a second discharge port positioned to discharge metal from the unit; and
(g) a third discharge port positioned to discharge slag from the unit;
means for feeding the waste material into the waste conversion unit such that a metal layer, a slag layer and a gaseous phase is formed in the unit;
a gas clean-up unit attached to the unit, the gas clean-up unit configured to separate the gases discharged from the unit into fuel gas and particulate matter;
a gas turbine electricity generating unit attached to the clean-up unit, the gas turbine electricity generating unit configured to utilize the fuel gas from the clean-up unit to produce electricity; and
means for introducing a predetermined amount of auxiliary fuel at a predetermined rate into the gas turbine electricity generating unit.

23. The waste conversion system of claim 22, wherein the auxiliary fuel is heating oil, diesel fuel or natural gas.

24. The waste conversion system of claim 22, wherein the gas turbine electricity generating unit is replaced by an internal combustion engine-generator unit.

25. The waste conversion system of claim 24, wherein the auxiliary fuel is heating oil, diesel fuel or natural gas.

26. The waste conversion system of claim 22, wherein the first power supply source is a DC power supply source comprising:
at least one transformer having at least one primary winding and at least one secondary winding;
at least one saturable reactor having a first end and a second end, the first end of the at least one saturable reactor connected to the at least one secondary winding of the transformer;
rectification means having at least one AC input terminal and first and second DC output terminals, the at least one AC input terminal connected to the second end of the at least one saturable reactor, the first DC output terminal connected to a counter electrode in the unit; and
an inductor having a first end and a second end, the first end connected to the second terminal of the DC output of the rectification means and the second end connected to the at least one arc plasma electrode.

27. The waste conversion system of claim 26, wherein the DC power supply source is configured to provide stable transfer arc operation.

28. The waste conversion system of claim 22, wherein the second power supply source is an AC power supply source, comprising:
at least one transformer having at least one primary winding and at least one secondary winding;
at least one capacitor connected in series with the secondary winding of the transformer and connected to a first of the plurality of the joule heating electrodes; and
at least one saturable reactor connected in series with the secondary winding of the transformer and connected to a second of the plurality of joule heating electrodes.

29. The waste conversion system of claim 28, wherein the first power supply source is a DC power supply source.

30. The waste conversion system of claim 29, wherein the DC power supply source comprises:
at least one transformer having at least one primary winding and at least one secondary winding;
at least one saturable reactor having a first end and a second end, the first end of the at least one saturable reactor connected to the at least one secondary winding of the transformer;
rectification means having at least one AC input terminal and first and second DC output terminals, the at least one AC input terminal connected to the second end of the at least one saturable reactor, the first DC output terminal connected to a counter electrode in the unit; and
an inductor having a first end and a second end, the first end connected to the second terminal of the DC output of the rectification means and the second end connected to the at least one arc plasma electrode.

31. The waste conversion system of claim 30, wherein the DC power supply source is configured to provide stable transfer arc operation.

32. The waste conversion system of claim 22, further including at least one metal discharge port and at least one slag discharge port in predetermined positions in the system.

33. The waste conversion system of claim 32, wherein the metal discharge port is positioned proximate to a bottom surface of the unit.

34. The waste conversion system of claim 32, wherein the slag discharge port extends upwardly at a predetermined angle relative to a side surface of the unit and wherein the slag discharge port is positioned above a bottom surface of the unit and below a surface of the molten pool.

35. The waste conversion system of claim 34, further including an auxiliary heating chamber attached to the slag discharge port.

36. The waste conversion system of claim 22, wherein the unit is in the form of an elongated chamber.

37. The waste conversion system of claim 22, wherein the number of arc plasma electrodes is two.

38. The waste conversion system of claim 22, wherein the number of arc plasma electrodes is greater than two.

39. The waste conversion system of claim 22, wherein six joule heating electrodes are positioned in the unit, the six joule heating electrodes each connected to the second power supply source and configured to provide volumetric joule heating in the molten pool.

40. The waste conversion system of claim 22, wherein the at least one arc plasma electrode is a graphite electrode.

41. The waste conversion system of claim 40, wherein the at least one arc plasma electrode includes a protective coating.

42. An integrated arc plasma-joule heated melter waste conversion unit, comprising:

at least one arc plasma electrode;

a first power supply source connected to the at least one arc plasma electrode and characterized in that an arc plasma generated between the at least one arc plasma electrode and a molten pool in the unit is on top of or within the molten pool;

a plurality of joule heating electrodes; and a second power supply source connected to the plurality of joule heating electrodes and configured to provide volumetric joule heating in the molten pool;

wherein the first and second power supply sources are configured such that each is separately and independently controlled during simultaneous operation to provide predetermined amounts of arc plasma heat and joule heat.

43. The waste conversion unit of claim 42, wherein waste material introduced into the unit forms a gas, a vitrifiable slag and metal when exposed to the arc plasma heating.

44. The waste conversion unit of claim 42 or 43, wherein the joule heat is configured to maintain the molten pool in a molten state.

45. The waste conversion unit of claim 44, wherein the first and second power supply sources are configured such that each is operated without detrimental electrical interaction with one another.

46. The waste conversion unit of claim 45, wherein the first power supply source is a DC power supply source and the second power supply source is an AC power supply source.

47. An integrated arc plasma-joule heated melter waste conversion unit, comprising:

at least one arc plasma electrode;

a DC power supply source connected to the at least one arc plasma electrode and characterized in that an arc plasma generated between the at least one arc plasma electrode and a molten pool in the unit is on top of or within the molten pool;

a plurality of joule heating electrodes; and an AC power supply source connected to the plurality of joule heating electrodes and configured to provide volumetric joule heating in the molten pool;

wherein the DC and AC power supply sources are configured such that each is operated without detrimental electrical interaction with one another; and wherein the DC and AC power supply sources are separately and independently controlled during operation to provide predetermined amounts of arc plasma heat and joule heat such that waste material introduced into the unit forms a gas, a vitrifiable slag and metal when exposed to the arc plasma heat and such that the joule heat is configured to maintain the molten pool in a molten state.

48. An integrated arc plasma-joule heated melter waste conversion unit, comprising:

at least one transfer arc plasma electrode;

a DC power supply source connected to the at least one transfer arc plasma electrode and characterized in that an arc plasma generated between the at least one arc plasma electrode and a molten pool in the unit is on top of or within the molten pool;

a plurality of joule heating electrodes; and an AC power supply source connected to the plurality of joule heating electrodes and configured to provide volumetric joule heating in the molten pool, the AC power supply source comprising:

at least one transformer having at least one primary winding and at least one secondary winding;

at least one capacitor connected in series with the at least one secondary winding of the at least one transformer and connected to a first of the plurality of the joule heating electrodes; and at least one saturable reactor connected in series with the at least one secondary winding of the at least one transformer and connected to a second of the plurality of joule heating electrodes; and wherein the DC and AC power supply sources are configured such that each is simultaneously operated without detrimental electrical interaction with one another; and wherein the DC and AC power supply sources are separately and independently controlled during operation to provide predetermined amounts of arc plasma heat and joule heat such that waste material introduced into the unit forms a gas, a vitrifiable slag and metal when exposed to the arc plasma heat and such that the joule heat is configured to maintain the molten pool in a molten state.

49. The integrated arc plasma-joule heated melter waste conversion unit of claim 48, wherein the DC power supply source is configured to provide stable operation and comprises:

at least one transformer having at least one primary winding and at least one secondary winding;

at least one saturable reactor having a first end and a second end, the first end of the at least one saturable reactor connected to the at least one secondary winding of the transformer;

rectification means having at least one AC input terminal and first and second DC output terminals, the at least one AC input terminal connected to the second end of the at least one saturable reactor, the first DC output terminal connected to a counter electrode in the unit; and an inductor having a first end and a second end, the first end connected to the second terminal of the DC output of the rectification means and the second end connected to the at least one arc plasma electrode.

50. The integrated arc plasma-joule heated melter waste conversion unit of claim 48 or 49, wherein the unit includes at least one wall having a refractory material attached to at least a portion thereof and wherein the at least one transfer arc plasma electrode is positioned to reduce thermal radiation on the at least one wall and the refractory material.

51. An integrated arc plasma-joule heated melter waste conversion unit, comprising:

at least one transfer arc plasma electrode;

at least one counter electrode;

a DC power supply source connected to the at least one transfer arc plasma electrode and characterized in that a stable arc plasma generated between the at least one arc plasma electrode and a molten pool in the unit is on top of or within the molten pool, the DC power supply source comprising:

at least one transformer having at least one primary winding and at least one secondary winding;

at least one saturable reactor having a first end and a second end, the first end of the at least one saturable reactor connected to the at least one secondary winding of the transformer;

rectification means having at least one AC input terminal and first and second DC output terminals, the at least one AC input terminal connected to the second end of the at least one saturable reactor, the first DC output terminal connected to the at least one counter electrode in the unit; and an inductor having a first end and a second end, the first end connected to the second terminal of the DC output of the rectification means and the second end connected to the at least one arc plasma electrode;

at least one wall having a refractory material attached to at least a portion thereof, the at least one transfer arc plasma electrode positioned to reduce thermal radiation on the least one wall and the refractory material;

first, second, third, fourth, fifth and sixth joule heating electrodes; and an AC power supply source connected to the joule heating electrodes and configured to provide volumetric joule heating in the molten pool, the AC power supply source comprising:

transformer means having three primary windings and first, second and third secondary windings;

first, second and third capacitors each respectively connected in series with the first, second and third secondary windings of the transformer means and each respectively connected to the first, second and third joule heating electrodes; and first, second and third saturable reactors each respectively connected in series with the first, second and third secondary windings of the transformer means and each respectively connected to the fourth, fifth and sixth joule heating electrodes;

wherein the DC and AC power supply sources are configured such that each is simultaneously operated without detrimental electrical interaction with one another; and wherein the DC and AC power supply sources are separately and independently controlled during operation to provide predetermined amounts of arc plasma heat and joule heat such that waste material introduced into the unit forms a gas, a vitrifiable slag and metal when exposed to the arc plasma heat and such that the joule heat is configured to maintain the molten pool in a molten state.

* * * * *